United States Patent
Fanta et al.

(10) Patent No.: US 6,709,763 B2
(45) Date of Patent: Mar. 23, 2004

(54) FORMATION OF HYDROPHILIC POLYSACCHARIDE COATINGS ON HYDROPHOBIC SUBSTRATES

(75) Inventors: George F. Fanta, Morton, IL (US); Frederick C. Felker, Morton, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 107 days.

(21) Appl. No.: 09/989,365

(22) Filed: Nov. 20, 2001

(65) Prior Publication Data

US 2003/0096126 A1 May 22, 2003

(51) Int. Cl.⁷ .............................................. B32B 33/00
(52) U.S. Cl. ...................... 428/532; 428/507; 428/480; 428/474.4; 427/374.1
(58) Field of Search ................. 428/532, 507, 428/480, 474.4; 427/374.1

(56) References Cited

U.S. PATENT DOCUMENTS

| | | | |
|---|---|---|---|
| 3,317,330 A | | 5/1967 | Livingston et al. |
| 4,156,664 A | * | 5/1979 | Skinner et al. ............. 524/504 |
| 4,728,694 A | | 3/1988 | Batich et al. |
| 5,852,078 A | | 12/1998 | Willett et al. |
| 6,040,063 A | | 3/2000 | Doane et al. |

FOREIGN PATENT DOCUMENTS

| | | | | |
|---|---|---|---|---|
| EP | 0480362 A2 | * | 4/1992 | ......... C09D/103/02 |
| JP | 61-085450 | * | 1/1986 | ............. C08J/9/26 |
| JP | 06-040485 | * | 2/1994 | ........... B65D/85/76 |
| JP | 04-296373 | * | 4/1994 | ............ A23G/3/00 |
| JP | 06-113746 | * | 4/1994 | ............ A23G/3/00 |

OTHER PUBLICATIONS

Lewis, Richard, ed., Hawley's Condensed Chemical Dictionary, 13th ed., John Wiley & Sons, Inc.: 1997, pp. 304, 1044–1045.*

Dwight, David, "Practicing polymer surface chemistry–a stream of consciousness", ChemTech, Mar. 1982, pp. 166–171.

Dasgupta, Sunil, "Surface Modification of Polyolefins for Hydrophilicity and Bondability: Ozonization and Grafting Hydrophilic Monomers on Ozonized Polyolefins", Journal of Applied Polymer Science, vol. 41, pp. 233–248, 1990.

Terlingen, Johannes G. A. et al., "Introduction of Functional Groups on Polyethylene Surfaces by a Carbon Dioxide Plasma Treatment", Journal of Applied Polymer Science, vol. 57, pp. 969–982, 1995.

Yamada, Kazunori et al., "Hydrophilic and Adhesive Properties of Methacrylic Acid–Grafted Polyethylene Plates", Journal of Applied Polymer Science, vol. 44. pp. 993–1001, 1992.

Rasmussen, James R. et al., "Introduction, Modification, and Characterization of Functional Groups on the Surface of Low–Density Polyethlene Film", Journal of the American Chemical Society, vol. 99, pp. 4736–4745, Jul. 1977.

* cited by examiner

Primary Examiner—Samuel A. Acquah
Assistant Examiner—Melanie Bissett
(74) Attorney, Agent, or Firm—Curtis P. Ribando; John D. Fado

(57) ABSTRACT

Articles produced from hydrophobic polymers (e.g., polyethylene) are surface-coated with thin films of starch in order to render the surfaces hydrophilic. The thin coatings form on the surfaces of plastic objects when the objects are placed in contact with hot, aqueous solutions of starch. These starch coatings are extremely adherent to the hydrophobic plastic surfaces under both wet and dry conditions, and they permit the surfaces to be uniformly wet with water. Resultant products have improved biocompatibility, improved compatibility with hydrophilic reagents, reduced build-up of electrostatic charge, reduced blocking, reduced friction, improved absorption of water-based dyes, and improved adhesion properties. The starch coatings are non-toxic, inexpensive and biodegradable.

23 Claims, No Drawings

FORMATION OF HYDROPHILIC POLYSACCHARIDE COATINGS ON HYDROPHOBIC SUBSTRATES

BACKGROUND OF THE INVENTION

1. Field of the Invention

This invention relates to compositions comprised of a plastic component and a water-soluble hydroxylic polymer component and to a simple process for preparing these compositions. The hydroxylic polymer constitutes only a minor percentage, by weight, of the total composition and is present as a thin coating on the surface of the plastic. The hydroxylic polymer is typically a polysaccharide such as starch. Although the amount of polysaccharide deposited on the surface of the plastic is often too small to be seen without the aid of a microscope, it is sufficient to allow the hydrophobic plastic surface to be wet with a uniform film of water that does not readily separate from the surface as droplets or beads. Polysaccharide coatings are formed spontaneously, in the absence of any additives, when granular starch is dissolved at high temperature and pressure by steam jet cooking, and the resulting dilute starch solution is placed in contact with the plastic surface and allowed to cool. The polysaccharide coating remains attached to the plastic surface, even after prolonged soaking in water followed by drying.

2. Description of the Prior Art

The properties and chemical composition of starch and the methods used to prepare aqueous dispersions and solutions of starch are described in Eskins et al. (U.S. Pat. Nos. 5,676,994 and 5,882,713, which are herein incorporated by reference). Briefly, starch is a high polymer composed of repeating glucose units and is typically a mixture of linear and branched polymers, i.e., amylose and amylopectin. Cornstarch is the most plentiful and least expensive of all the commercial starch varieties. Although normal food grade cornstarch contains about 25% amylose by weight, commercial varieties of cornstarch are available that contain 0% amylose (waxy cornstarch) and about 50% and 70% amylose by weight (high amylose cornstarch). Normal cornstarch is the least expensive starch variety and is thus the preferred starch for the purposes of this invention. Starch occurs in living plants as granules ranging from about 5 to 40 microns in diameter, depending upon the plant source. These granules are essentially insoluble in water at room temperature; however, a significant amount of starch begins to dissolve and diffuse out of the granule matrix as the temperature reaches about 70° C., which is the approximate gelatinization temperature. Although water-solubility increases with temperature, starch granules do not dissolve completely, even at 100° C.; and a major portion of the starch remains as highly swollen but insoluble granule fragments. True solutions of starch in water, with no remaining insoluble material, are difficult to prepare using conventional batch-cooking techniques; and autoclaves are typically required for batch cooking. However, starch solutions are easily prepared on a continuous basis by passing aqueous dispersions of starch through a steam jet cooker at elevated temperatures and pressures. This process has been used commercially for decades to prepare starch solutions for industrial applications and is discussed in more detail in Eskins et al. (U.S. Pat. Nos. 5,676,994 and 5,882,713, supra) and also in an article by R. E. Klein and D. A. Brogly (Pulp & Paper, 55: 98–103, May, 1981). Dissolved molecules of starch (especially amylose) tend to associate with one another through hydrogen bond formation and form gels and precipitates when solutions are cooled. This property is commonly known as retrogradation and is an inherent property of all starch pastes and solutions.

It is well known that practical end-use applications of polymeric materials are often dictated by their surface properties. This fact is particularly true for polymer films, for example, polyethylene. Although polyethylene films exhibit high levels of strength, toughness, flexibility and percent elongation, their hydrophobic surfaces repel water, thus ruling out or severely limiting their use in many applications. Adhesion, dye absorption, friction, electrostatic charging, biocompatibility and compatibility with hydrophilic reagents are all examples of polymer properties that are negatively influenced by poor surface wetting. A number of techniques for improving the surface wetting of hydrophobic polymers have been described, and the subject of surface modification of polymers has been summarized in an article by Dwight (CHEMTECH, March 1982, p. 166). Other articles have also appeared that describe methods used to modify polymer surfaces. For example, Rasmussen et al., (Journal of the American Chemical Society, Vol. 99, 1977, p. 4736) describe oxidation of the surface of polyethylene film with solutions of chromic acid and nitric acid. Foltynowicz (Macromolecules, Vol. 18, 1985, p. 1394) describe polymerization of surfactants on the surface of polyethylene to alter the surface properties. Dasgupta (Journal of Applied Polymer Science, Vol. 41, 1990, p. 233) describes the modification of polyethylene and polypropylene surfaces by treatment with ozone. Nakayama & Matsuda (Journal of Polymer Science: Part A: Polymer Chemistry, Vol. 31, 1993, p. 3299) describe the fixation of poly (ethylene glycol) on the surface of hydrophobic polymers by chemical reaction. Terlingen et al. (Journal of Applied Polymer Science, Vol. 57, 1995, p. 969) describe the introduction of functional groups onto polyethylene surfaces by a carbon dioxide plasma treatment. Graft polymerization of hydrophilic monomers onto the surfaces of hydrophobic polymers is also a frequently used technique for modifying surface properties. Representative examples of this technique may be found in publications by Uchida, et al. (Journal of Polymer Science: Part A: Polymer Chemistry, Vol. 27, 1989, p. 527), Yamada, et al. (Journal of Applied Polymer Science, Vol. 44, 1992, p. 993), and Tretinnikov & Ikada (Macromolecules, Vol. 30, 1997, p. 1086).

References related to the treatment of hydrophobic polymers to render their surfaces more hydrophilic are also found in the patent literature. For example, U.S. Pat. No. 4,728,694 discloses the graft polymerization of acrylamide onto polyethylene surfaces by first oxidizing the surface to form carbonyl substituents, reducing these substituents to form hydroxyl groups, and finally using a free radical initiator to initiate graft polymerization. In another representative example, U.S. Pat. No. 3,526,583 discloses a method for increasing surface hydrophilicity which involves the treatment of a hydrophobic polymer with a gas that has been excited by radio frequency radiation. Finally, U.S. Pat. No. 3,317,330 discloses a method for producing hydrophilic surfaces on polyethylene and polypropylene by treating the surfaces with an oxidizing solution that contains sulfuric acid, chromium trioxide and potassium permanganate.

It is apparent that in all of the prior art cited above, surface modification is carried out by treating hydrophobic polymers with chemical reagents that are either toxic, corrosive or expensive; and that the processing techniques employed are often complicated and costly. All of the above surface modification techniques are therefore unrelated to this invention, which provides a method for coating hydrophobic surfaces by a simple procedure that uses inexpensive and nontoxic starch.

SUMMARY OF THE INVENTION

This invention is based on the unexpected discovery that starch coatings having a thickness of approximately one micrometer or less are spontaneously formed on the surfaces of hydrophobic polymers (e.g., polyethylene films), when the hydrophobic polymers are placed in contact with hot, aqueous solutions of starch, preferably prepared by steam jet cooking at elevated temperatures and pressures. These starch coatings are characterized by a number of important properties: (1) they do not separate from the hydrophobic plastic surface, even after prolonged standing in water; (2) they cause the surface of the hydrophobic polymer to be uniformly wet with water, as evidenced by contact angle measurements and by the absence of water droplets or beads of water on the polymer surface; (3) when dried, thin starch coatings remain firmly attached to the hydrophobic polymer surface, and these coatings separate only when the plastic article or film is vigorously wiped or rubbed; (4) the dried, starch-coated plastic surface re-wets instantly when it is placed in contact with water.

The hydrophilic surface properties of starch-coated plastics prepared according to this invention make them suitable for a number of specialized applications, such as those that require improved biocompatibility, improved compatibility with hydrophilic reagents, reduced build-up of electrostatic charge, reduced blocking, reduced friction, improved absorption of water-based dyes, and improved adhesion properties. Also, these starch coatings are non-toxic, inexpensive and biodegradable; and they form spontaneously on plastic surfaces from aqueous solutions of starch that are easily and inexpensively prepared by a continuous steam jet cooking process. Despite the fact that the hydrophobic plastic surface and the hydrophilic starch coating are mutually incompatible, thin starch coatings remain firmly attached after the coated film has been soaked in water and dried.

In accordance with this discovery, it is an object of this invention to provide a novel class of starch-coated plastic articles, in which starch is present in amounts sufficient to impart hydrophilic properties to the hydrophobic plastic surface. Normally, the percentage of starch, by weight, in the coated plastic article is approximately 1% or less. Heavier starch coatings (i.e., those having higher starch percentages) may be applied; however, these heavier starch coatings tend to separate more easily from the plastic surface.

It is also an object of the invention to provide a process for the effective and facile preparation of the starch-coated plastic compositions of the invention.

Other objects and advantages of the invention will become apparent from the following discussion.

DETAILED DESCRIPTION OF THE INVENTION

The starch coatings of this invention are preferably prepared from unmodified starches obtained from cereal grains, such as corn, wheat, sorghum and rice, or from root and tuber crops, such as cassava, potato and tapioca. Although a variety of different starches may be used, it will be recognized by those skilled in the art that differences in amylose content, branching, molecular weight and content of native lipid between the various starch varieties will result in different chemical and physical properties, and will thus exert an influence upon the thickness and properties of these starch coatings. As previously indicated, starches are available commercially that have widely varying proportions of amylose and amylopectin. Although any of these cornstarch varieties may be used to prepare the starch-coated plastics of this invention, the starch coatings tend to be thicker and to form more rapidly as the percentage of amylose in the starch increases. Although the coatings of this invention preferably consist essentially of starch, cereal flour (i.e., the finely milled meal consisting essentially of the starch and protein components of the endosperm) can also be used.

An unmodified starch is one that has not been altered by chemical treatment or reduced in molecular weight by reaction with acids or enzymes. Although modified starches are more expensive than unmodified starches, they may be used to impart certain properties to the coated plastic article that are not easily obtained with unmodified starch. For example, a cationic or anionic starch may be used to impart cationic or anionic properties to the plastic surface.

Some non-limiting examples of hydrophobic plastics that may be used as substrates for these starch coatings are polyethylene, polypropylene, polystyrene and the polymer classes generally known as polyesters and polyamides. These plastic materials will often be two-dimensional (planar) articles, such as thin films or sheets; however, three-dimensional (non-planar) plastic objects such as those typically formed by molding or extruding plastic may also be used. Polyethylene film is the most common substrate used.

The first step in the preparative process is to jet cook an aqueous slurry of starch at a near-neutral pH (i.e., pH 5–7), preferably using an excess steam jet cooker (see Klem & Brogly, supra). The experimental conditions chosen are those needed to attain complete disruption of starch granules and complete solution in water of both the amylose and amylopectin components of starch. The effects of steam jet cooking on the structure and properties of starch are discussed in two articles by Dintzis et al. (Journal of Rheology, Vol.39, 1995, p. 1483; and Journal of Applied Polymer Science, Vol. 62, 1996, p. 749). We believe that the ability of starch to separate from a hot aqueous solution and to firmly attach itself to the surface of a hydrophobic polymer is related to the fact that both amylose and amylopectin are rendered totally water soluble by the high temperature and the intense mixing that occurs during the steam jet cooking process. Although the conditions used for steam jet cooking may be varied by one skilled in the art, temperature and steam pressure within the hydroheater are typically about 130°–150° C. and 20–50 psig, respectively; pumping rate is typically about 0.75–2.0 liters per minute; and steam line pressure entering the cooker is typically about 65–120 psig. The concentration of starch in water is preferably in the range of about 0.5–5%, by weight; and this concentration will depend upon the amylose content of the starch used. Low starch concentrations would be used with high amylose starches, because these materials form firm gels when jet cooked solutions are cooled. In contrast, waxy starch may be used at higher concentrations; since this starch does not readily form gels; and water solutions of waxy starch remain fluid and pourable even at relatively high concentrations. Gelling of starch solutions must be avoided during the preparative process, and cooled starch solutions must remain in a fluid and non-gelled state, even after they have reached room temperature or below. A concentration of about 1% is preferred when normal food grade cornstarch is used; since concentrations of about 4% tend to produce heavy, uneven coatings that sometimes separate from the plastic surface.

The second step in the preparative process is to submerge the plastic article in the hot, jet cooked starch solution and then allow the mixture to cool to near room temperature. One technique is to collect the hot, jet cooked starch solution (as it emerges from the cooker) in an insulated container (e.g., a Dewar flask); however, more rapid cooling may be accomplished by placing the hot starch solution in a non-insulated container (e.g., a glass or stainless steel beaker) before submerging the plastic article. The thickness and uniformity of the starch coating is affected by the rate of cooling of the hot starch solution. In most instances, heavier starch coatings are obtained when starch solutions are slowly cooled; however, these coatings are often non-uniform and sometimes separate from the surface of the plastic. Slow stirring during cooling tends to enhance the uniformity of the coating. When the starch solution containing the submerged plastic has cooled to approximately room temperature, the plastic is removed and preferably soaked for several hours in water to remove loosely-bound starch. The starch-coated plastic may then be optionally dried.

In a commercial operation, it would be desirable to employ a continuous or countercurrent feed of the plastic articles through the starch solution as known in the art. It is also envisioned that certain alternative coating methods, such as spraying of the starch solution onto the plastic surface, could also be employed; provided that the amount of starch solution and the temperature are sufficiently controlled during the period of contact with the plastic to permit adherent coating of the starch onto the plastic.

The starch-coated plastics of this invention are characterized by the appearance of a water-wet surface. Few, if any, discrete water droplets appear on the wet plastic surface; and the surface remains substantially wet (i.e., water will not form beads and run off), even when the plastic article is held in a vertical position. A water-wet surface is also indicated by contact angle measurements. That is, water droplets on starch-coated plastics of the invention are characterized by a relatively small contact angle as compared to water droplets on uncoated surfaces. After drying, starch-coated plastic surfaces exhibit a frosty appearance due to deposition of starch. The presence of starch can also be identified by its infrared spectrum and also by the characteristic blue color that results from treatment of coated films with a dilute aqueous solution of iodine/potassium iodide. When starch coatings become excessively heavy, they tend to be non-uniform (i.e., some areas of the plastic surface are more heavily coated than others). A disadvantage of heavy starch coatings is their tendency to flake off the plastic surface, when the starch-coated article is bent or flexed. Conversely, thin starch coatings remain firmly attached after drying and are separated from the plastic surface only by vigorous rubbing. Scanning electron microscopy shows that starch is deposited onto the plastic surface as nodules with diameters of approximately 1 micrometer or less. Under a dissecting light microscope, the starch appears as a distinct thin layer covering the plastic surface. In general, the level of application should be at least about 0.01 mg starch/cm$^2$ of plastic, and less than about 1 mg starch/cm$^2$ of plastic. Preferably, the level of application will be at least about 0.02 mg starch/cm$^2$ of plastic, and less than about 0.1 mg starch/cm$^2$ of plastic in order to yield highly adherent coatings.

The following examples further illustrate the invention but do not limit the invention, which is defined by the claims. All references disclosed herein are incorporated by reference.

EXAMPLE 1

This example describes one embodiment of the invention, wherein normal, food grade cornstarch (having an amylose content of about 25% by weight) is jet cooked to give a starch solution containing about 4% solids; and the hot starch solution is then contacted with polyethylene film without stirring. Two different rates of cooling are compared.

A dispersion of 228 grams of normal food grade cornstarch (containing about 12% moisture) in 4 L of deionized water was steam jet cooked under the following conditions: 40 psig in the hydroheater, 70 psig line pressure, and a pumping rate of about 1 L/minute. The hot, jet cooked solution (containing 4.2% starch solids) was collected in an insulated Dewar flask. A second jet cooked starch solution was prepared under identical conditions, and 3 L of this hot solution was placed in a non-insulated beaker. To each of these hot starch solutions was added two 3"×6" commercial low-density polyethylene bags, which had been cleaned with a warm (50° C.) solution of laboratory detergent (45 g of Alconox® in 4 L of water). Weights were placed in the bags so that they would remain completely submerged. The bags were allowed to stand in the unstirred starch solutions for 19.5 hours. At the end of this time period, the temperature of the starch solution in the Dewar flask was 58° C. In contrast, the solution in the beaker had cooled to 29° C. after 5.5 hours. The bags were removed from the starch solutions, and loosely bound starch was removed from the polyethylene surfaces by soaking the bags in water (three changes of deionized water and a total soaking time of about 4 hours at room temperature).

An uneven starch coating was observed when cooling was carried out slowly in the Dewar flask, and the polyethylene surface exhibited both light and heavy coverage. The starch coating in the lightly coated areas amounted to about 1% of the film sample weight (coating on one surface only). This is equivalent to about 0.094 mg starch/cm$^2$. Heavily coated areas contained about 4–8% starch (equivalent to about 0.39–0.81 mg starch/cm$^2$). Rapid cooling in the beaker produced a more even coating (as shown by scanning electron microscopy) on the polyethylene surface, and this starch coating amounted to about 1%, by weight, of the polyethylene sample. Although starch in heavily-coated areas tended to flake off the surface, after the film was dried, starch in the lightly-coated areas remained firmly attached after drying, and vigorous rubbing was required to separate it from the polyethylene surface.

EXAMPLE 2

Experimental conditions were similar to Example 1, except that the jet cooked starch solutions were slowly stirred as they were allowed to cool. Rapid cooling (beaker) produced a starch coating that amounted to about 1%, by weight, of the polyethylene sample. Slow cooling (Dewar flask) produced a coating that amounted to about 0.65% of the sample weight. This is equivalent to about 0.061 mg starch/cm$^2$. As shown by scanning electron microscopy, the plastic is evenly coated with the starch.

EXAMPLE 3

Experimental conditions were similar to Example 1, except that waxy cornstarch (containing 0% amylose) was used instead of normal food grade cornstarch. As in Example 1, starch solutions were not stirred. Rapid cooling (beaker) produced a starch coating that amounted to about 0.1–0.2%, by weight, of the polyethylene sample. This is equivalent to about 0.0093–0.019 mg starch/cm$^2$. Slow cooling in the Dewar flask produced a coating that amounted to about 0.5% of the sample weight (equivalent to about 0.047 mg starch/cm$^2$).

EXAMPLE 4

Experimental conditions were similar to Example 1, except that high amylose cornstarch containing about 70% amylose by weight was used instead of normal food grade cornstarch; and the starch concentration in the hot, jet cooked solution was adjusted to about 1%, so that gel formation would not occur on cooling. As in Example 1, starch solutions were not stirred. Rapid cooling (beaker) produced a starch coating that amounted to about 0.6% of the polyethylene sample weight. This is equivalent to about 0.056 mg starch/cm$^2$. Slow cooling in the Dewar flask produced an uneven coating of starch that amounted to about 1.55% of the polyethylene sample weight.

EXAMPLE 5

Experimental conditions were similar to Example 1, except that the concentration of normal food grade cornstarch in the hot, jet cooked solution was adjusted to about 1%. As in Example 1, starch solutions were not stirred. Rapid cooling (beaker) produced a starch coating that amounted to about 0.8% of the polyethylene sample weight. This is equivalent to about 0.075 mg of starch/cm$^2$. Slow cooling in the Dewar flask produced an uneven coating of starch that amounted to about 0.8–1.9% of the polyethylene sample weight (equivalent to about 0.075–0.18 mg of starch/cm$^2$)

EXAMPLE 6

A dispersion of 50.0 g of normal food grade cornstarch in 4 L of water was jet cooked as in Example 1, and the hot, jet cooked solution was collected in an insulated Dewar flask. This solution (containing 1.13% starch solids) was poured into a 3-L beaker (to about 1 cm above the 2500 mL mark), and two 31"×6" polyethylene bags (washed as in Example 1) were suspended in the hot solution. The solution (about 80° C.) was then stirred with a magnetic stirring bar for 24 hours at about 100 rpm, while it was allowed to cool to room temperature. The bags were removed from the starch solution, washed with deionized water as in Example 1, and allowed to air-dry at room temperature. A 20 cm$^2$ portion was cut from the starch-coated bag and analyzed for starch using the phenol/sulfuric acid method described by W. R. Morrison and B. Laignelet in Journal of Cereal Science, Vol.1, 1983, pp. 9–20. In two experiments carried out under outwardly identical conditions, starch deposited on the polyethylene surface amounted to 0.022 and 0.043 mg/cm$^2$. This variability in starch coverage did not affect the hydrophilic surface properties of the starch-coated polyethylene sample.

EXAMPLE 7

Example 6 was repeated using potato starch instead of normal food grade cornstarch. The jet cooked potato starch solution contained 1.08% starch solids, and the initial and final temperatures were 79.4° C. and 20.0° C., respectively. The amount of starch deposited on the polyethylene surface was 0.053 mg/cm$^2$ (determined as in Example 6).

EXAMPLE 8

Example 6 was repeated using wheat starch instead of normal food grade cornstarch. The jet cooked wheat starch solution contained 1.14% starch solids, and the initial and final temperatures were 79.1° C. and 21.2° C., respectively. The amount of starch deposited on the polyethylene surface was 0.056 mg/cm$^2$ of polyethylene (determined as in Example 6).

EXAMPLE 9

Example 6 was repeated using unbleached wheat flour instead of normal food grade cornstarch. The jet cooked wheat flour solution contained 1.15% solids, and the initial and final temperatures were 75.3° C. and 22.1° C., respectively. The amount of starch deposited on the polyethylene surface was 0.083 mg/cm$^2$ of polyethylene (determined as in Example 6)

EXAMPLE 10

Normal food grade cornstarch was jet cooked and collected as in Example 6. This solution (containing 1.13% and 1.15% starch solids in two repeat experiments) was poured into a 4-L beaker to about 1 cm above the 3500 mL mark), and two 6"×6" polyethylene bags (washed as in Example 1) were suspended in the hot solution. The solution was stirred and allowed to cool as in Example 6. The initial temperature was 80.1° C., and the final temperature was 17.9° C. The bags were removed from the starch solution, washed with deionized water as in Example 1, and allowed to air dry at room temperature. Starch was removed from the surfaces of four 12×12 cm squares of starch-coated polyethylene, and this surface starch (in water dispersion) was freeze-dried and weighed. Surface coverage of starch was 0.0467 mg/cm$^2$ using this gravimetric method and was 0.0594 mg/cm$^2$ using the phenol/sulfuric acid method of Example 6. In a repeat experiment carried out under similar conditions, the initial temperature was 77.4° C.; and the final temperature was 23.6° C. In this experiment, the two analytical methods gave values of 0.0470 and 0.0575 mg starch/cm$^2$, respectively.

The surface wetting of starch-coated polyethylene prepared in above experiments was verified by measuring the contact angles of water drops placed on the polyethylene surface. The instrument used for these measurements was a Tantec Contact Angle Meter, Model CAM-MICRO, manufactured by Tantec, Shaumberg, Ill. A contact angle of 44° was observed for the starch-coated polyethylene samples; whereas a contact angle of 72° was observed for uncoated polyethylene. The lower contact angle for the starch-coated samples indicates improved surface wetting (expanded surface contact by individual water droplets) due to the starch coating.

EXAMPLE 11

This experiment shows that surface coverage of plastics such as polyethylene can be achieved in time periods of 4 hours or less, if starch is jet cooked to yield solutions containing 45% starch by weight.

A dispersion of 225.3 g of normal, food grade cornstarch (containing 11.2% moisture) was jet cooked and collected as in Example 1. The hot jet cooked solution (containing 4.44% starch solids) was poured into a 4-L beaker, and two 6"×6" polyethylene bags were added as in Example 10. The mixture was stirred for 4 hours as in Example 6 (initial temperature: 80.3° C.; final temperature: 58.9° C.), and the bags were removed, washed with water and air dried. Analysis of surface starch using the phenol/sulfuric acid method described in Example 6 gave a value of 0.0825 mg of starch/cm$^2$.

A similar experiment in which polyethylene bags were stirred for only 1 hour with jet cooked starch solution produced a hydrophilic surface that appeared uniformly wet with water; however, starch on the surface of the air-dried film was barely visible.

EXAMPLE 12

Example 10 was repeated using waxy cornstarch (containing 0% amylose) instead of normal food grade cornstarch. The jet cooked waxy cornstarch solution contained 1.16% solids, and the initial and final temperatures were 79.8° C. and 23.8° C., respectively. The amount of starch deposited on the polyethylene surface was 0.034 mg/cm$^2$ of polyethylene, using the phenol/sulfuric acid method described in Example 6.

EXAMPLE 13

Example 10 was repeated using high amylose cornstarch (amylose content about 70%) instead of normal food grade cornstarch. The jet cooked high amylose cornstarch solution contained 1.14% solids, and the initial and final temperatures were 80.9° C. and 23.7° C., respectively. The amount of starch deposited on the polyethylene surface was 0.050 mg/cm$^2$ of polyethylene, using the phenol/sulfuric acid method described in Example 6.

We claim:

1. An article of manufacture comprising a hydrophobic polymeric substrate having an adherent, firmly attached hydrophilic coating of solubilized starch, said coating having a thickness of approximately 1 micrometer or less.

2. The article of claim 1, wherein said hydrophobic polymeric substrate is a film or sheet.

3. The article of claim 1, wherein said hydrophobic substrate is a three-dimensional object.

4. The article of claim 1, wherein said hydrophobic polymeric substrate is a material selected from the group consisting of polyethylene, polypropylene, polystyrene, polyester, and polyamide.

5. The article of claim 1, wherein said hydrophobic polymeric substrate is a material comprising polyethylene.

6. The article of claim 1, wherein said starch is selected from the group of corn starch, wheat starch, rice starch, sorghum starch, potato starch, cassava starch and tapioca starch.

7. The article of claim 1, wherein said starch is selected from the group of waxy starch, high amylose starch, and a starch comprising about 25% amylose by weight.

8. The article of claim 1, wherein said starch coating on said polymeric substrate is present in an amount of at least about 0.01 mg starch/cm$^2$ of polymeric substrate.

9. The article of claim 1, wherein said starch coating on said polymeric substrate is present in an amount of at least about 0.02 mg starch/cm$^2$ of polymeric substrate.

10. The article of claim 1, wherein said starch coating on said polymeric substrate is present in an amount of less than about 1 mg starch/cm$^2$ of polymeric substrate.

11. The article of claim 1, wherein said starch coating on said polymeric substrate is present in an amount of less than about 0.08 mg starch/cm$^2$ of polymeric substrate.

12. A method for rendering hydrophilic the surface of a hydrophobic polymeric substrate comprising the steps:

a. contacting said substrate with a solubilized starch at a temperature above the gelatinization temperature of the starch; and b. holding said substrate in contact with the solubilized starch until the temperature of the starch cools to below the gelatinization temperature, whereby said starch forms on said substrate an adherent, firmly attached hydrophilic coating having a thickness of approximately 1 micrometer or less.

13. The method of claim 12, wherein said solubilized starch is in aqueous solution.

14. The method of claim 13, wherein the starch concentration of said solution is in the range of about 0.5–5% by weight.

15. The method of claim 12, wherein said solubilized starch is jet-cooked starch.

16. The method of claim 12, wherein said hydrophobic polymeric substrate is a material selected from the group consisting of polyethylene, polypropylene, polystyrene, polyester, and polyamide.

17. The method of claim 12, wherein said hydrophobic polymeric substrate is a material comprising polyethylene.

18. The method of claim 12, wherein said starch is selected from the group of corn starch, wheat starch, rice starch, sorghum starch, potato starch, cassava starch, tapioca starch and flours thereof.

19. The method of claim 12, wherein said starch is selected from the group of waxy starch, high amylose starch, and a starch comprising about 25% amylose by weight.

20. The article of claim 1, wherein said solubilized starch is totally solubilized.

21. The article of claim 1, wherein said solubilized starch is jet cooked starch.

22. The article of claim 1, wherein said hydrophilic coating of solubilized starch consists essentially of starch or cereal flour.

23. The article of claim 1, wherein said hydrophilic coating of solubilized starch consists of nodules.

* * * * *